US 11,678,058 B2

(12) United States Patent
Kang et al.

(10) Patent No.: US 11,678,058 B2
(45) Date of Patent: Jun. 13, 2023

(54) METHOD AND SYSTEM FOR PROVIDING INTELLIGENT CONTROL BY USING RADAR SECURITY CAMERA

(71) Applicant: Green IT Korea Co., Ltd., Namyanggiu-si (KR)

(72) Inventors: Wonsik Kang, Seoul (KR); Dongho Seok, Suwon-si (KR)

(73) Assignee: Green IT Korea Co., Ltd., Namyanggiu-si (KR)

( * ) Notice: Subject to any disclaimer, the term of this patent is extended or adjusted under 35 U.S.C. 154(b) by 169 days.

(21) Appl. No.: 17/463,553

(22) Filed: Sep. 1, 2021

(65) Prior Publication Data
US 2023/0007183 A1   Jan. 5, 2023

(30) Foreign Application Priority Data
Jun. 30, 2021   (KR) .......................... 10-2021-0085796

(51) Int. Cl.
| G01S 13/00 | (2006.01) |
| H04N 23/695 | (2023.01) |
| G01S 13/86 | (2006.01) |
| G01S 13/72 | (2006.01) |
| H04N 23/69 | (2023.01) |

(52) U.S. Cl.
CPC ......... *H04N 23/695* (2023.01); *G01S 13/726* (2013.01); *G01S 13/867* (2013.01); *H04N 23/69* (2023.01)

(58) Field of Classification Search
CPC ................................ H04N 23/00; G01S 13/00
See application file for complete search history.

(56) References Cited

U.S. PATENT DOCUMENTS

| 9,778,351 | B1 * | 10/2017 | Khosla ................. H04N 23/698 |
| 2022/0400202 | A1 * | 12/2022 | Imes ...................... H04N 23/69 |

FOREIGN PATENT DOCUMENTS

| JP | 2014-194686 A | 10/2014 |
| KR | 10-2011-0075250 A | 7/2011 |
| KR | 10-2015-0004202 A | 1/2015 |
| KR | 10-2017-0114045 A | 10/2017 |

* cited by examiner

Primary Examiner — Maryam A Nasri
(74) Attorney, Agent, or Firm — Revolution IP, PLLC

(57) ABSTRACT

An intelligent control method and system using a radar security camera are disclosed, wherein a target is detected by 360° radar sensing regardless of the rotation radius of a camera by using the security camera having a built-in radar, and the camera is enabled to track the target according to the moving direction and specific signs of the target after the target is identified as a person and a vehicle sequentially according to a decision priority order.

11 Claims, 13 Drawing Sheets

METHOD AND SYSTEM FOR PROVIDING INTELLIGENT CONTROL BY USING RADAR SECURITY CAMERA

CROSS-REFERENCE TO RELATED APPLICATION(S)

This application is based on and claims priority under 35 U.S.C. § 119 to Korean Patent Application No. 10-2021-0085796 filed on Jun. 30, 2021 in the Korean Intellectual Property Office, the disclosure of which is incorporated by reference herein in its entirety.

BACKGROUND

1. Field

The disclosure relates to a method and system for providing intelligent control by using a radar security camera.

2. Description of Related Art

The following information is presented as background information only to assist with an understanding of the present disclosure. No determination has been made, and no assertion is made, as to whether any of the above might be applicable as prior art with regard to the present disclosure.

Over the past years, main roads or back road alleys have been increasingly monitored in real time by using closed-circuit television (CCTV) control systems, for the purpose of crime prevention or security maintenance.

A CCTV control system includes a plurality of capturing units on roads or alleys, and a control server in a control center, which is connected to the capturing units and receives captured images from the capturing units in real time. An operator of the control center monitors images captured by each capturing unit or stores the images in the control server.

Each capturing unit includes a support and a CCTV camera provided on the support. The support is installed vertically on the ground, and the CCTV camera is installed on the support, facing downward and captures images of the surroundings downward from a high place.

The control server is connected to CCTV cameras by wired communication lines and loaded with a control program for managing images captured by the CCTV cameras and monitoring an abnormality in the capturing units. When a received image is abnormal or a captured image is not received due to a defect of a CCTV camera or a communication line, the control server determines that an abnormality has occurred in a capturing unit, that is, a support or a CCTV camera by using the control program, and outputs a warning to inform the operator that an abnormality has occurred.

Recently, video security systems have been used to improve the security and stability of monitoring and control systems used in various industrial fields such as power, gas, oil, and facility security.

Most video security systems are constructed and operated separately from monitoring and control systems, and operators mainly monitor the video security systems manually. Therefore, upon occurrence of an accident, it is difficult to immediately respond to the accident and manage and utilize the video security systems, thereby lowering their utilization.

For general security, security lights and CCTVs should be installed. Particularly, at least three CCTVs should be installed to shoot 360° images. Alternatively, a security light and a 360° camera may be installed. However, a short sensing distance inherent to the nature of the 360° camera leads to a very narrow shooting range.

When only a CCTV or a 360° camera is installed, an image may be captured only within a predetermined range for the installation location. When an image processing apparatus is installed together with a CCTV or a 360° camera, image processing requires high cost and a long processing time. Moreover, shooting at night is impossible and does not allow image processing.

To cover a 360° range with a conventional security camera for crime prevention, a total of five cameras including four fixed cameras and one speed dome camera should be used. The speed dome camera is operated in such a way that an operator manually pans, tilts, and zooms the camera to monitor an abnormal condition.

In other words, the conventional security camera for crime prevention causes budget waste and has limitations in controlling practically all images because about 500 cameras per person on average are controlled in the country. For example, in Goyang City, a service cost of one billion won is invested for control every year, and if the central government's policy of conversion of non-regular employment into regular employment is implemented under the premise that the current personnel are maintained, the budget should be increased by at least 1.5 times after 2018. Therefore, the financial burden of local governments increases.

SUMMARY

Provided are a method and system for providing intelligent control by using a radar security camera, which detect a target through 360° radar sensing by using a security camera with a built-in radar regardless of the rotation radius of the camera, determine whether the target is a person or a vehicle according to a decision priority, and enable the camera to track the target according to a movement direction and a specific sign of the target.

Additional aspects will be set forth in part in the description which follows and, in part, will be apparent from the description, or may be learned by practice of the presented embodiments of the disclosure.

According to an aspect of the disclosure, an intelligent control method includes acquiring an image while rotating 360° in one predetermined direction by a camera, transmitting a radar signal in a coverage covering 360° by using two radar sensors each covering 180°, receiving the radar signal reflected from a target existing within the coverage, determining whether a target exists within the coverage based on the reflected signal, when a target exists within the coverage, determining whether a decision priority for the target existing within the coverage is a person or a vehicle, determining whether the target has an abnormal sign, while tracking the target in an order based on the decision priority, when it is determined that the target has an abnormal sign, calculating direction information and distance information about the target, rotating the camera in a direction corresponding to the direction information by controlling pan, tilt, and zoom (PTZ) of the camera, and capturing and recording the target showing the abnormal sign by adjusting an angle of the camera to an angle corresponding to the distance information.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

An embodiment of the present disclosure will be described below in detail with reference to the accompanying drawings.

Figure 1:
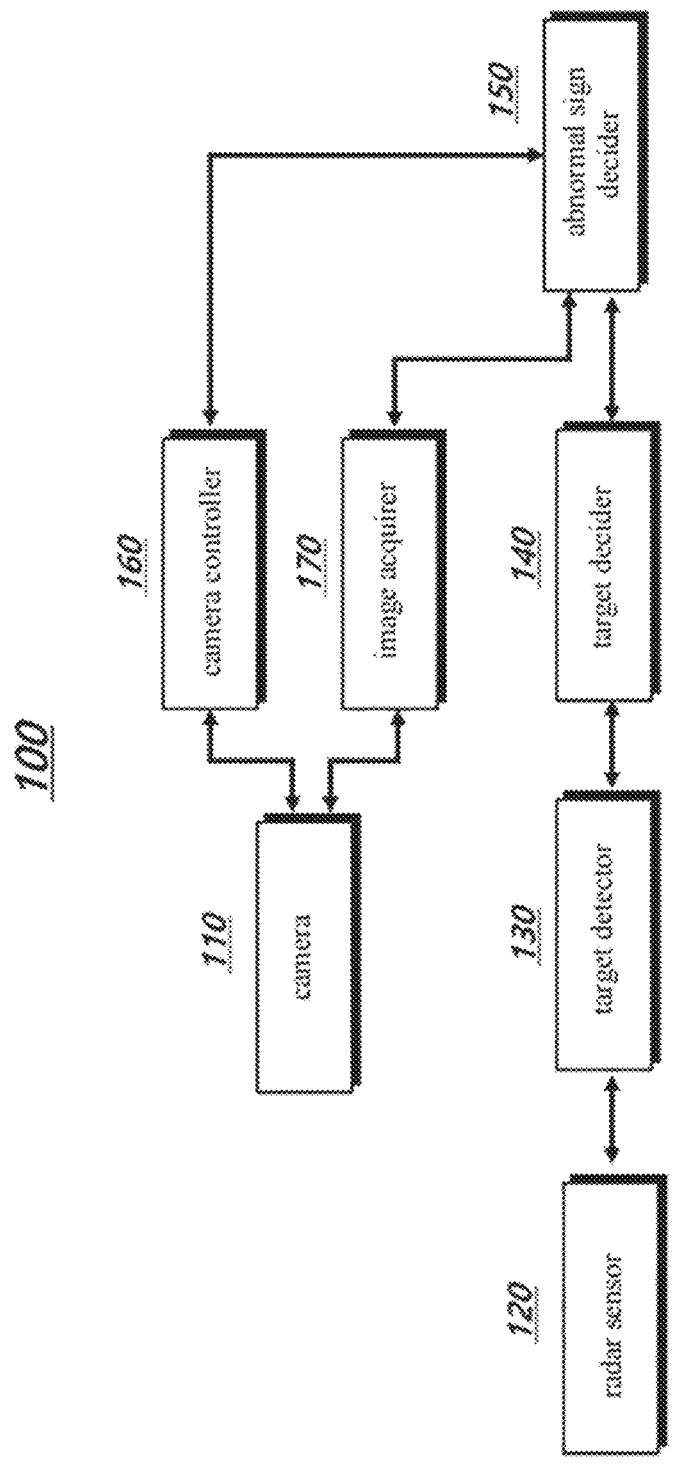
FIG. 1 is a block diagram illustrating an intelligent control system using a radar security camera according to an embodiment of the present disclosure.

FIG. 1 is a block diagram illustrating an intelligent control system using a radar security camera according to an embodiment of the present disclosure.

A radar security camera 100 according to an embodiment of the present disclosure includes a camera 110, a radar sensor 120, a target detector 130, a target decider 140, an abnormality decider 150, a camera controller 160, and an image acquirer 170. The radar security camera 100 is not necessarily limited to the above components.

The components of the radar security camera 100 may be connected to a communication path connecting software modules or hardware modules inside the radar security camera 100 to organically operate with each other. These components communicate with each other by using one or more communication buses or signal lines.

Each component of the radar security camera 100 illustrated in FIG. 1 is a unit for processing at least one function or operation, and may be implemented as a software module, a hardware module, or a combination of software and hardware.

The camera 110 acquires an image, while rotating 360° in one predetermined direction. The camera 110 refers to an image acquisition device that acquires an image. The camera 110 includes a closed-circuit television (CCTV). The camera 110 is coupled to a rotation member and rotates in one predetermined direction.

The radar sensor 120 includes two radar sensors each covering 180°. The radar sensor 120 transmits a radar signal with a 360° coverage by using the two radar sensors each covering 180°. The radar sensor 120 is included as a built-in type inside the radar security camera 100.

The target detector 130 receives the radar signal reflected from a target within the coverage. The target detector 130 determines whether a target exists within the coverage based on the reflected signal.

In the presence of a target within the coverage, the target decider 140 determines whether the decision priority of a target within the coverage is a person or a vehicle. The target decider 140 tracks the target in a decision priority order.

When determining the decision priority of the target to be a person, the target decider 140 tracks the target within the coverage, recognizing the target primarily as a person. Upon completion of the tracking of the person, the target decider 140 tracks the target within the coverage, recognizing the target secondarily as a vehicle.

When the decision priority is determined to be a person, the target decider 140 operates in a day mode or a night mode according to a current time.

On the other hand, when the decision priority is determined to be a vehicle, the target decider 140 tracks the target within the coverage, recognizing the target primarily as a vehicle. Upon completion of the tracking of the vehicle, the target decider 140 tracks the target within the coverage, recognizing the target secondarily as a person.

The abnormality decider 150 determines whether the target has an abnormal sign. When determining that the target has an abnormal sign, the abnormality decider 150 calculates direction information and distance information about the target. The abnormality decider 150 controls the pan, tilt, and zoom (PTZ) of the camera 110 to rotate the camera 110 in a direction corresponding to the direction information, and adjusts the angle of the camera 110 to an angle corresponding to the distance information to capture and record the target showing an abnormal sign.

The abnormality decider 150 determines whether the target exists within the coverage for a predetermined first threshold time (e.g., 30 seconds) or longer based on the reflected signal. When the target exists within the coverage for the first threshold time (e.g., 30 seconds) or longer, the abnormality decider 150 determines whether the target existing within the coverage for the first threshold time (e.g., 30 seconds) or longer is identical to a previously detected target. When the target existing within the coverage for the first threshold time (e.g., 30 seconds) or longer is not identical to the previously detected target, the abnormality decider 150 calculates direction information and distance information about the target, determining the target as an abnormal condition. The abnormality decider 150 adjusts the PTZ of the camera 110 to rotate the camera 110 in a direction corresponding to the direction information about the target existing within the coverage for the first threshold time (e.g., 30 seconds) or longer, and adjusts the angle of the camera 110 to an angle corresponding to the distance information, to capture and record the target showing an abnormal sign.

The abnormality decider 150 determines whether the target is moving at a predetermined first threshold speed (e.g., 10 km/h) or larger within the coverage based on the reflected signal. When the target is moving at a speed equal to or larger than the first threshold speed (e.g., 10 km/h) within the coverage, the abnormality decider 150 determines whether the target moving at the speed equal to or larger than the first threshold speed (e.g., 10 km/h) within the coverage is identical to a previously detected target.

When the target moving at the speed equal to or larger than the first threshold speed (e.g., 10 km/h) within the coverage is not identical to the previously detected target, the abnormality decider 150 calculates direction information and distance information about the target, determining that the target moving at the speed equal to or larger than the first threshold speed (e.g., 10 km/h) in the daytime as an abnormal condition. The abnormality decider 150 adjusts the PTZ of the camera 110 to rotate the camera 110 in a direction corresponding to the direction information about the target moving at the speed equal to or larger than the first threshold speed (e.g., 10 km/h) in the daytime, and adjusts the angle of the camera 110 to an angle corresponding to the distance information, to capture and record the target showing an abnormal sign.

The abnormality decider 150 determines whether there are two or more targets (persons) within the coverage based on the reflected signal. When there are two or more targets (persons) within the coverage, the abnormality decider 150 calculates the distance between the targets (persons).

The abnormality decider 150 determines whether the two or more targets (people) are within a predetermined threshold distance (e.g., 50 m). When determining that the two or more targets (people) are within the predetermined threshold distance (e.g., 50 m), the abnormality decider 150 determines whether the two or more targets (people) within the predetermined threshold distance (e.g., 50 m) are identical to previously detected targets.

When the two or more targets (people) within the predetermined threshold distance (e.g., 50 m) are not identical to previously detected targets, the abnormality decider 150 calculates direction information and distance information about the targets, determining that the two or more targets (persons) within the predetermined threshold distance (e.g., 50 m) at night as an abnormal condition.

The abnormality decider 150 adjusts the PTZ of the camera 110 to rotate the camera 110 in a direction corresponding to the direction information about the two or more targets (people) within the predetermined threshold distance (e.g., 50 m), and adjusts the angle of the camera 110 to an angle corresponding to the distance information, to capture and record the targets showing an abnormal sign.

The abnormality decider 150 determines whether two or more targets are detected within the coverage for a predetermined second threshold time (e.g., 10 seconds) or longer. When detecting the two or more targets within the coverage for the predetermined second threshold time (e.g., 10 seconds) or longer, the abnormality decider 150 determines whether the two or more targets within the coverage for the predetermined second threshold time (e.g., 10 seconds) or longer are identical to previously detected targets.

When the two or more targets within the coverage for the predetermined second threshold time (e.g., 10 seconds) or longer are not identical to the previously detected targets, the abnormality decider 150 calculates direction information and distance information about the targets, determining the two or more targets detected within the coverage for the predetermined second threshold time (e.g., 10 seconds) or longer at night as an abnormal condition.

The abnormality decider 150 adjusts the PTZ of the camera 110 to rotate the camera 110 in a direction corresponding to the direction information about the two or more targets detected within the coverage for the predetermined second threshold time (e.g., 10 seconds) or longer at night, and adjusts the angle of the camera 110 to an angle corresponding to the distance information, to capture and record the targets showing an abnormal sign.

The abnormality decider 150 determines whether two or more targets are moving at a predetermined second threshold speed (e.g., 30 km/h) or larger within the coverage based on the reflected signal. When a target (vehicle) is moving at a speed equal to or larger than the second threshold speed (e.g., 30 km/h) within the coverage, the abnormality decider 150 determines whether the target moving at the speed equal to or larger than the second threshold speed (e.g., 30 km/h) within the coverage is identical to a previously detected target.

When the target moving at the speed equal to or larger than the second threshold speed (e.g., 30 km/h) within the coverage is not identical to the previously detected target, the abnormality decider 150 calculates direction information and distance information about the target, determining that the target moving at the speed equal to or larger than the second threshold speed (e.g., 30 km/h) within the coverage as an abnormal condition.

The abnormality decider 150 adjusts the PTZ of the camera 110 to rotate the camera 110 in a direction corresponding to the direction information about the target moving at the speed equal to or larger than the second threshold speed (e.g., 30 km/h) within the coverage, and adjusts the angle of the camera 110 to an angle corresponding to the distance information, to capture and record the target showing an abnormal sign.

The abnormality decider 150 determines whether a target moving within the coverage abruptly stops based on the reflected signal. When the target moving within the coverage suddenly stops, the abnormal decider 150 determines whether the target that suddenly stops moving is identical to a previously detected target.

When the target that suddenly stops moving is not identical to the previously detected target, the abnormality decider 150 calculates direction information and distance information about the target, determining the target suddenly stopping moving as an abnormal condition.

The abnormality decider 150 adjusts the PTZ of the camera 110 to rotate the camera 110 in a direction corresponding to the direction information about the target suddenly stopping moving in the daytime, and adjusts the angle of the camera 110 to an angle corresponding to the distance information, to capture and record the target showing an abnormal sign.

The camera controller 160 controls the PTZ of the camera 110 to adjust a viewing direction and angle of the camera 110. The image acquirer 170 acquires an image from the camera 110. The image acquirer 170 records and stores the image acquired from the camera 110.

Figure 2:
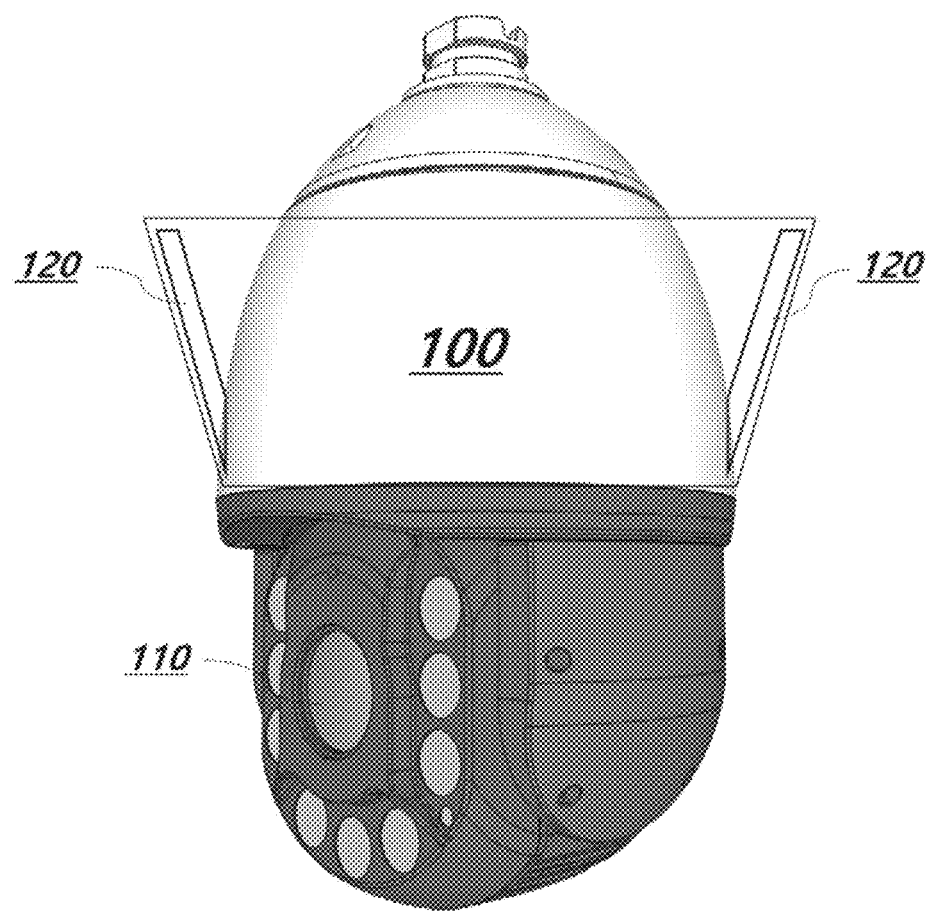
FIG. 2 is a diagram illustrating a radar security camera according to an embodiment of the present disclosure.

FIG. 2 is a diagram the radar security camera according to an embodiment of the present disclosure.

The radar security camera 100 includes the camera 110 and two built-in radar sensors 120 each covering 180°. The radar security camera 100 rotates the camera 110 in one predetermined direction to capture a surrounding area, while rotating 360°. The radar security camera 100 continuously operates with the two radar sensors 120 each covering 180° to sense the surrounding 360° area regardless of the viewing direction of the camera 110.

The radar security camera 100 replaces the role of a plurality of existing CCTVs or 360° cameras by a single CCTV or a single camera (complementing night photography).

The radar security camera 100 monitors a moving target within a predetermined coverage by the radar sensors 120 installed around the camera 110. The radar security camera 100 detects a moving object by using the radar sensors 120, sets the moving object as a target, rotates the CCTV in a direction to the target, and captures and records the target.

Upon occurrence of an abnormal sign due to the movement of the target, the radar security camera 100 generates an alarm, and transmits abnormal sign information to the control center or executes a recording function. The radar security camera 100 may automatically take an action and maintain public order, when an abnormal sign occurs due to the movement of the target.

The radar security camera 100 sets a threshold for the power value (proportional to a volume) of a moving target. The radar security camera 100 sets a limit on the speed value of the moving target so that a speed equal to or larger than a general walking speed is recognized as exceeding the threshold. The radar security camera 100 sets a monitoring distance by setting a distance value for the moving target.

The radar security camera 100 receives information about the moving target by using the radar sensors 120. The radar security camera 100 identifies the movement direction of the moving target and an abnormal sign. The radar security camera 100 calculates a direction or angle at which the abnormal sign has been detected based on an angle and distance at which the target has been detected. The radar security camera 100 rotates the camera 110 directed to a different location in the direction in which the abnormal sign has been detected, and capture and record the abnormal sign by the camera 110.

In the radar security camera 100, a pair of radar sensors 120 facing in opposite directions are combined with respect to the camera 110. The radar security camera 100 continuously monitors whether a target is detected based on a reflected radar signal regardless of a direction in which the camera 110 is directed by using the pair of the radar sensors 120.

The radar security camera 100 pre-stores information about a height at which the camera 110 is installed. The radar security camera 100 calculates a viewing angle based on the information about the height at which the camera 110 is installed. The radar security camera 100 calculates a distance based on an angle at which the camera 110 is directed.

The radar security camera 100 calculates a direction or angle at which the target has been detected from the received radar reflection signal by using the pair of the radar sensors 120. The radar security camera 100 matches a viewing angle with the direction and angle in which the target has been detected using the radar sensors 120, based on an image obtained from the camera 110. When the radar security camera 100 rotates the camera 110 in the corresponding direction based on only the absolute angle and distance at which the target has been detected.

The radar security camera 100 may rotate the camera 110 at 360° by controlling the PTZ. The radar sensors 120 are attached around the camera 110, and at least two radar sensors 120 detect in opposite directions. The radar sensors 120 may be fixedly installed to detect a target while rotating together with the camera 110 in a predetermined direction, or to detect only in a predetermined direction regardless of the rotation of the camera 110.

Figure 3:
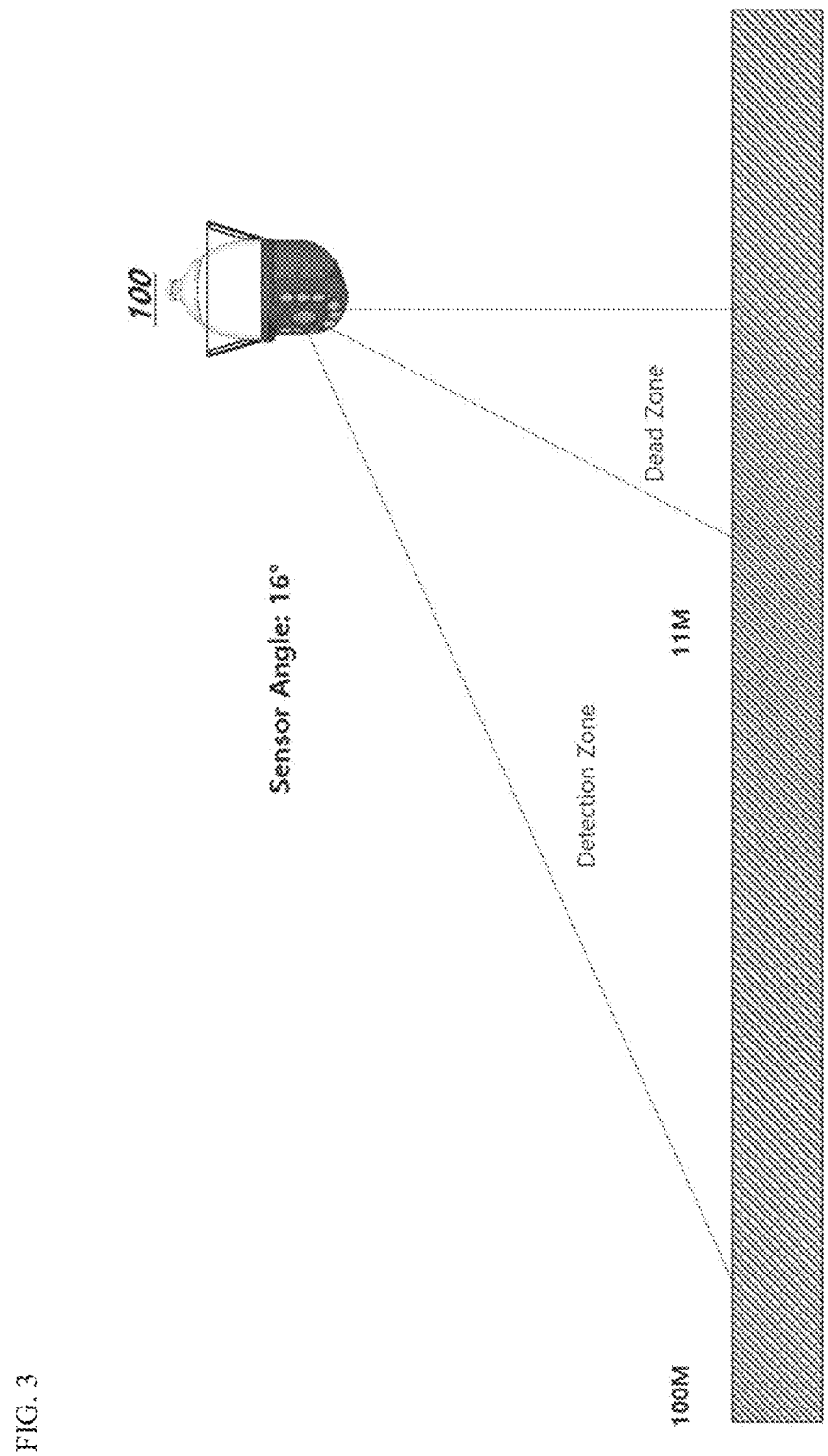
FIG. 3 is a diagram illustrating a detection zone according to a tilt angle of the radar security camera according to an embodiment of the present disclosure.

FIG. 3 is a diagram illustrating a detection zone according to the tilt angle of a radar security camera according to an embodiment of the present disclosure.

Each of the radar sensors 120 fixed to the radar security camera 100 is preferably installed at a fixed tilt angle, which should not be construed as limiting the present disclosure. Thus, the radar sensor 120 may be installed at a variable tilt angle.

The angle of the radar sensor 120 installed in the radar security camera 100 may be preferably 16°. The radar sensor 120 installed in the radar security camera 100 covers an area ranging from approximately 11 m to 100 m as a detection zone. Up to approximately 10 m vertically down from the installed position of the radar sensor 120 in the radar security camera 100 may be set as a dead zone.

Figure 4:
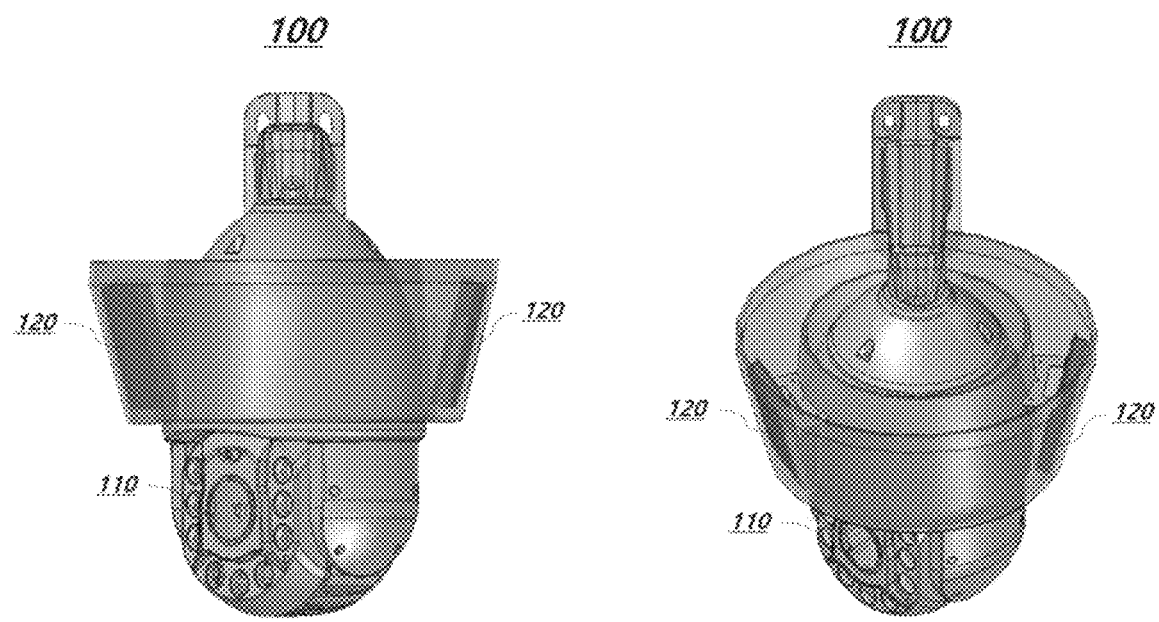
FIG. 4 is a diagram illustrating a radar combining mechanism for the radar security camera according to an embodiment of the present disclosure.

FIG. 4 is a diagram illustrating a radar combining method in the radar security camera according to an embodiment of the present disclosure.

A radar sensor 120 may be fixed to the radar security camera 100 by using a bracket as illustrated in FIG. 4. Two radar sensors 120 each covering 180° may be applied to the radar security camera 100.

The radar sensors 120 are preferably fixed by the bracket, which should not be construed as limiting the present disclosure. The coverage may be changed by connecting the bracket to a motor and adjusting a tilt angle.

The two radar sensors 120 each covering 180° are disposed at opposite positions so as to cover 360° with respect to a central axis.

Figure 5:
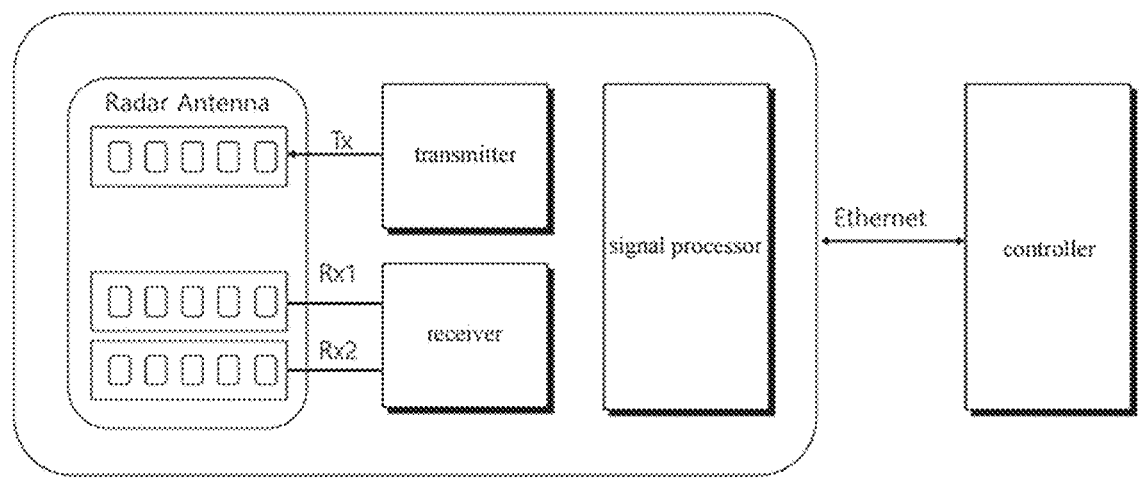
FIG. 5 is a block diagram illustrating a radar sensor according to an embodiment of the present disclosure.

FIG. 5 is a block diagram illustrating a radar sensor according to an embodiment of the present disclosure.

Each radar sensor 120 includes a pair of a transmitter and a receiver. The two radar sensors 120 sense a 360° area.

The radar security camera 100 calculates direction information and distance information about an object detected by the two radar sensors 120, and rotates the camera 110 in a direction corresponding to the direction information by adjusting the PTZ of the camera 110.

The radar security camera 100 filters out a meaningless motion in an image captured by the camera 110. The radar security camera 100 cancels noise and detects a target by an intelligent image analysis and detection technology. The radar security camera 100 accurately detects a target by a deep learning data generation technology.

The radar sensor 120 emits an electromagnetic wave toward an object to detect a movement, and then receives a wave reflected from the object to measure the distance or shape of the object.

The radar sensor 120 includes a transmitter, a receiver, and a signal processor.

The signal processor sets parameters for a waveform for radar transmission in the transmitter. The transmitter generates a waveform and transmits the waveform to a transmission antenna. Upon receipt of a carrier wave from the target through a reception antenna, the receiver transmits the carrier wave to the signal processor. The signal processor calculates the position (distance and angle) and speed of the target by a signal processing algorithm including fast Fourier transform (FFT), and then transmits information about the position (distance and angle) and speed of the target to a controller.

Figure 6:
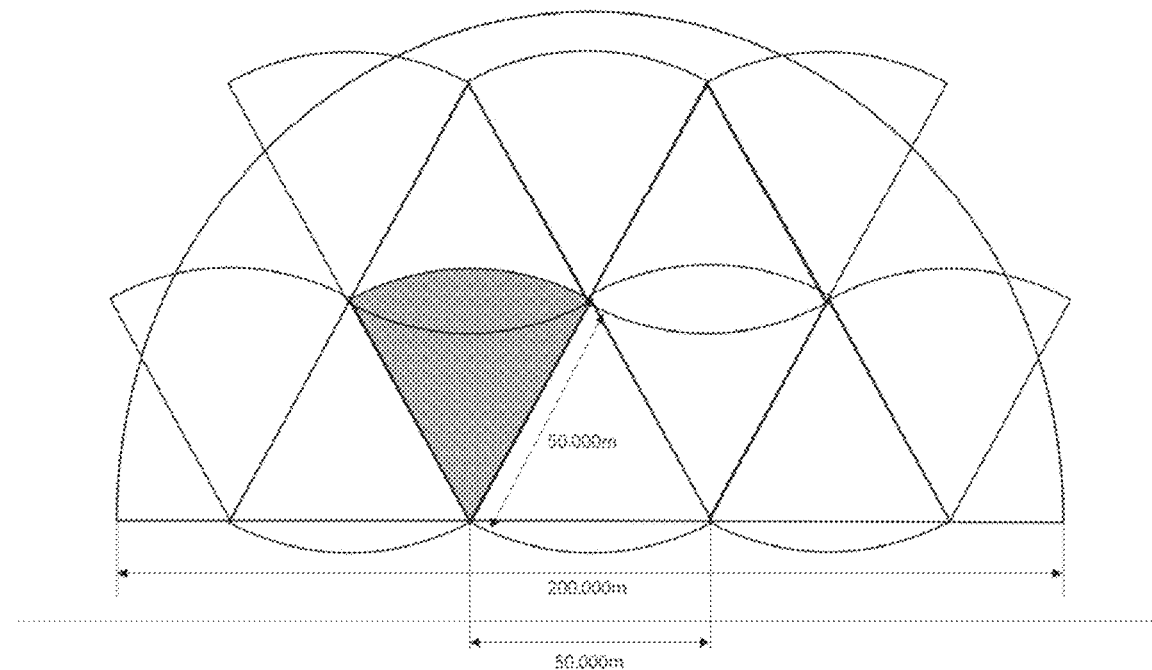
FIG. 6 is a diagram illustrating the detection zone of a radar sensor according to an embodiment of the present disclosure.

FIG. 6 is a diagram illustrating the detection zone of a radar sensor according to an embodiment of the present disclosure.

The radar sensor 120 according to the present embodiment has a wide detection zone as illustrated in FIG. 6.

Because the radar sensor 120 has a detection distance of 100 m and a horizontal angle of 180°, the radar sensor 120 has a detection zone 12 times wider than that of a camera having a detection distance of 50 m and a horizontal angle of 60°. In other words, to have the same detection zone as the radar sensor 120 according to the present embodiment, 12 cameras each having a detection distance of 50 m and a horizontal angle of 60° are required.

The radar sensor 120 includes an algorithm for removing a noise component from a radar signal and detecting an object.

Figure 7:
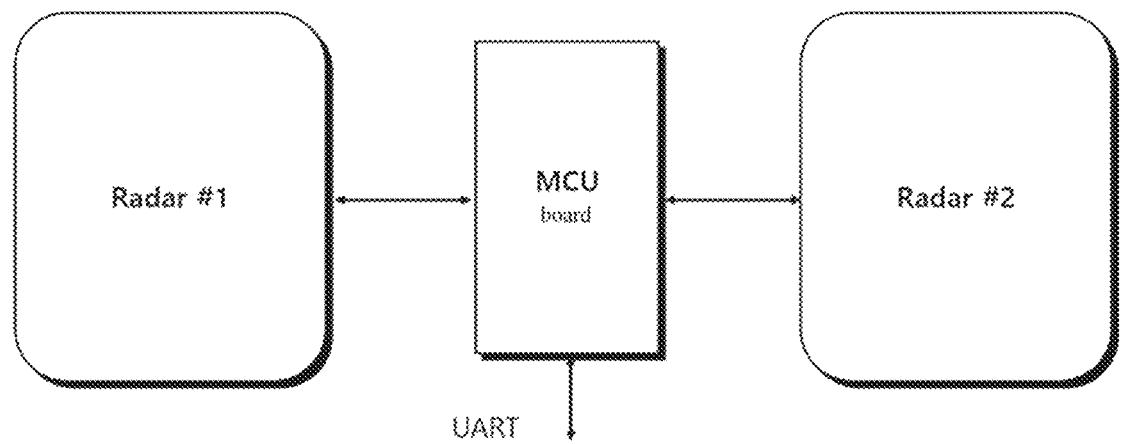
FIG. 7 is a diagram illustrating an arrangement structure of two radar sensors according to an embodiment of the present disclosure.

FIG. 7 is a diagram illustrating an arrangement structure of two radar sensors according to an embodiment of the present disclosure.

The radar sensor 120 has a human detection distance of 100 m and a detection angle of 180°, and includes a radar antenna having a use frequency of 24 GHz.

The radar sensor 120 is a security radar to which two sensors each having a detection angle of 180° are applied, to enable 360° monitoring, and has a structure that may extend a maximum horizontal angle by using the two radars.

In the radar sensor 120, two radars each having a detection angle of 180° are arranged in opposite directions. The two radars each having a detection angle of 180° are connected to one main control unit (MCU) board. The single MCU board manages both of the radars.

Figure 8:
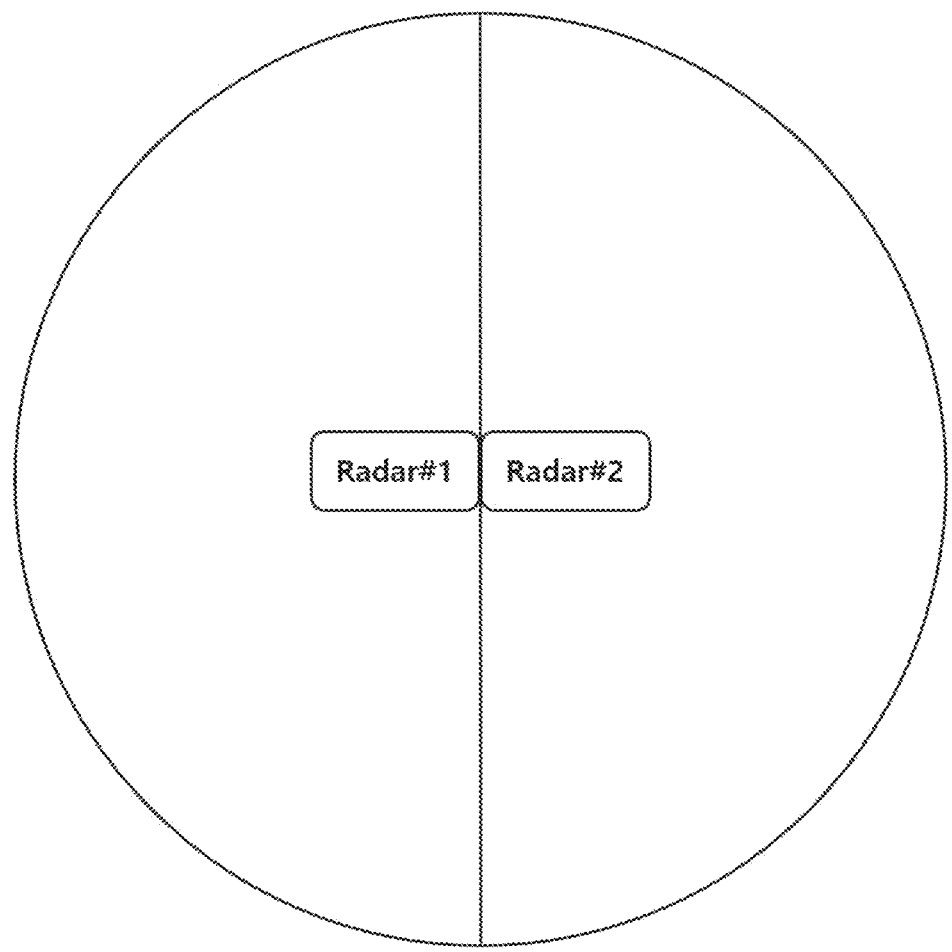
FIG. 8 is a diagram illustrating a 180° monitoring zone of each of the two radar sensors according to an embodiment of the present disclosure.

FIG. 8 is a diagram illustrating a 180° monitoring zone of each of two radar sensors according to an embodiment of the present disclosure.

Referring to FIG. 8, the radar sensor 120 may detect 360° by two radars each having a detection angle of 180° which have been installed in opposite directions. The two radars each having a detection angle of 180° included in the radar sensor 120 detect a target in a predetermined area.

Figure 9:
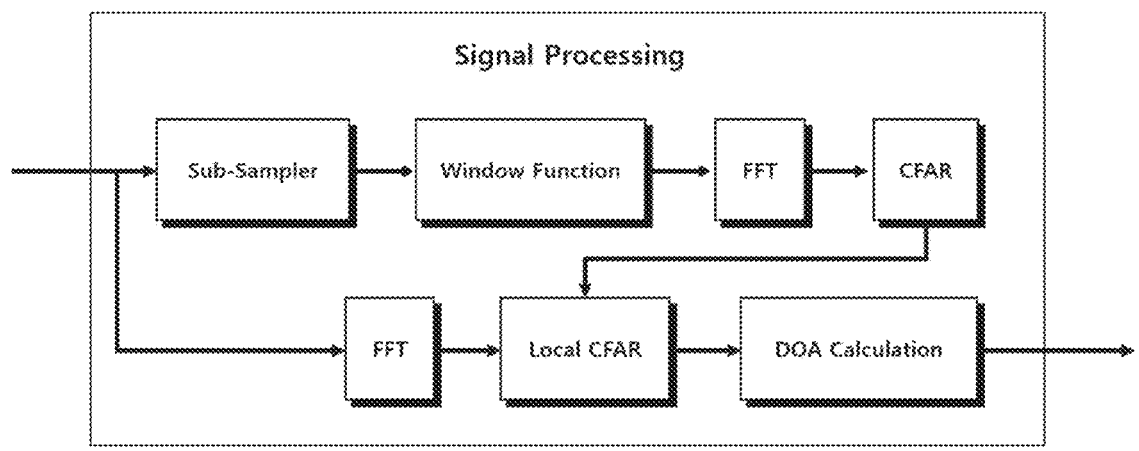
FIG. 9 is a block diagram illustrating an object detection algorithm in a radar sensor according to an embodiment of the present disclosure.

FIG. 9 is a block diagram illustrating an object detection algorithm in the radar sensor according to an embodiment of the present disclosure.

The radar sensor 120 detects an object by the object detection algorithm. The radar sensor 120 acquires an intermediate frequency (I/F) sampling signal from an antenna. The radar sensor 120 detects an object by processing the sampling signal.

The radar sensor 120 acquires a small number of samples by reducing N sampling signals acquired from the antenna at a predetermined ratio through a sub-sampler. The radar sensor 120 performs a computation process for reducing the side lobe of a sample by a window function. In this embodiment, Blackman Window is applied as the window function.

The radar sensor 120 FFT-processes the signal subjected to the window function. The radar sensor 120 determines whether an object exists in a corresponding window, while maintaining a CFAR for the FFT signal. The radar sensor 120 FFT-processes N sampling signals obtained from the antenna.

The radar sensor 120 is modified to monitor only the vicinity of a corresponding location based on information about a rough position of the object, which has been detected from the CFAR by using a local CFAR in the first step. When two or more reception (Rx) antennas are used, the radar sensor 120 measures a direction of arrival (DOA) between each radar and the object. The radar sensor 120 calculates the position (coordinates) of the object by also using distance information obtained by peek detection. The radar sensor 120 calculates the DOA in a mono pulse scheme.

Figure 10:
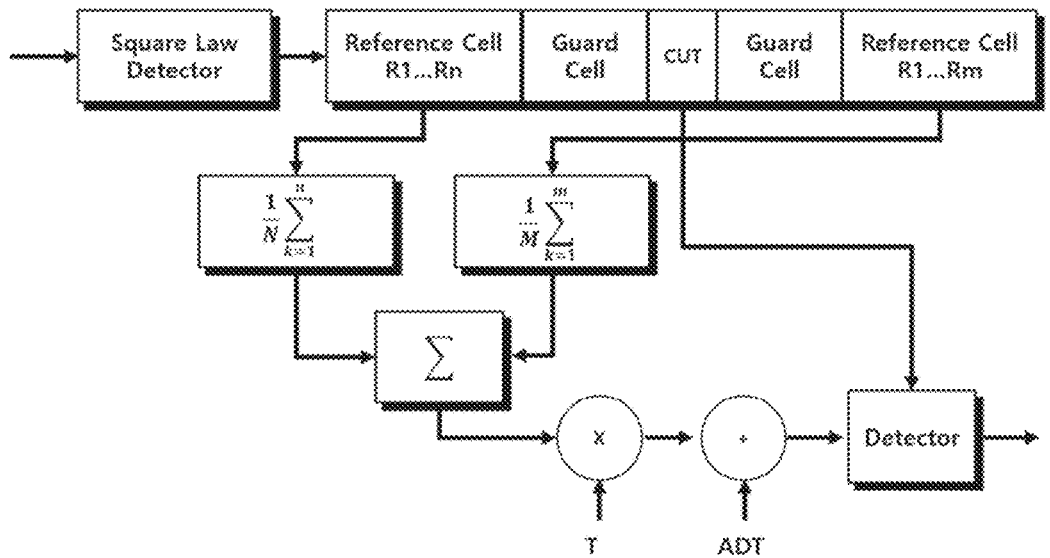
FIG. 10 is a block diagram referred to for describing a constant false alarm rate (CFAR) algorithm according to an embodiment of the present disclosure.

FIG. 10 is a diagram referred to for describing a CFAR algorithm according to an embodiment of the present disclosure.

In the case where the radar sensor 120 detects an object using a CFAR, when the magnitude of a signal reflected from the object is equal to or greater than a predetermined value, the radar sensor 120 identifies the object as an object. The radar sensor 120 selects a threshold to maintain an object detection error probability at a constant level by using the CFAR.

Referring to FIG. 10, the radar sensor 120 identifies whether a test cell is a target based on the relationship between the cell at a location to be tested and a neighboring cell by using the CFAR. The radar sensor 120 selects one of a plurality of algorithms CA-CFAR, GO-CFAR, SO-CFAR, OS-CFAR, VI-CFAR, and OSVI-CFAR depending on how the relationship with the surrounding cells is determined.

Figure 11:
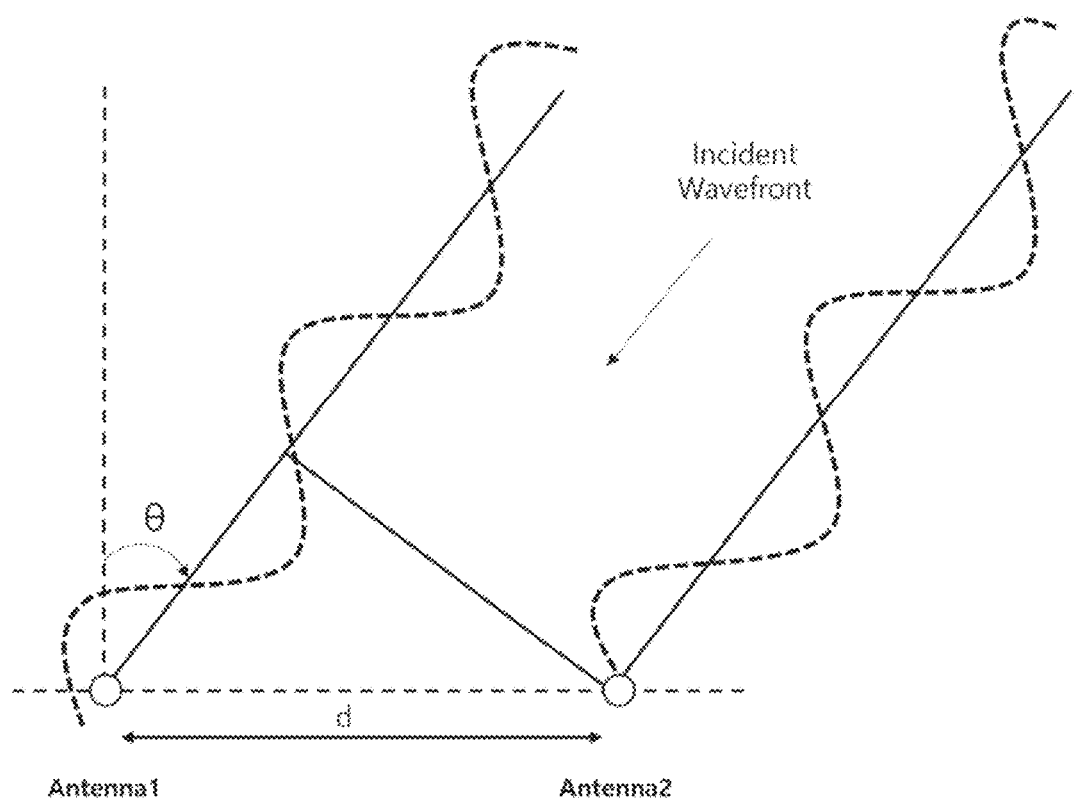
FIG. 11 is a diagram illustrating a method of calculating an angle of an object in the case of two or more reception antennas according to an embodiment of the present disclosure.

FIG. 11 is a diagram illustrating a method of calculating an angle of an object in the case of two or more Rx antennas according to an embodiment of the present disclosure.

The radar security camera 100 calculates the angle of an object using a DOA, when there are two or more Rx antennas. The radar security camera 100 calculates an angle from a phase difference between the two antennas of the radar sensor 120.

The radar security camera 100 sets various pieces of basic information for the radars to calculate the position of a moving object by a radar setting program. The radar security camera 100 receives the positions and directions of the radars, and an object motion detection zone in the radar detection zone, in a standard coordinate system.

The radar security camera 100 sets a protocol between the radar sensor 120 and the camera 110. The radar security camera 100 defines a communication protocol required for generating a communication channel between the radar sensor 120 and the camera 110, informing an intruder path, and transmitting an error when an abnormality occurs in a radar.

When a radar is powered on and connected to a network for the first time by self-registration (provision), the radar security camera 100 notifies the camera and a server connected to the current network of the connection of the new radar.

When a new camera or viewer is initially connected to the network through camera/viewer registration, the radar security camera 100 notifies the network of information and the state of each element. The radar security camera 100 also acquires and registers this information in the radar, and later transmits a radar error warning and an intruder warning to each element.

The radar security camera 100 generates a radar error warning. When a radar fails to detect for some reason or an error occurs in the radar due to a problem of the radar itself, the radar security camera 100 notifies the registered elements of the error.

The radar security camera 100 detects and informs an event. When the radar security camera 100 detects an event in an event detection zone, the radar security camera 100 notifies the registered elements of the event.

Figure 12:
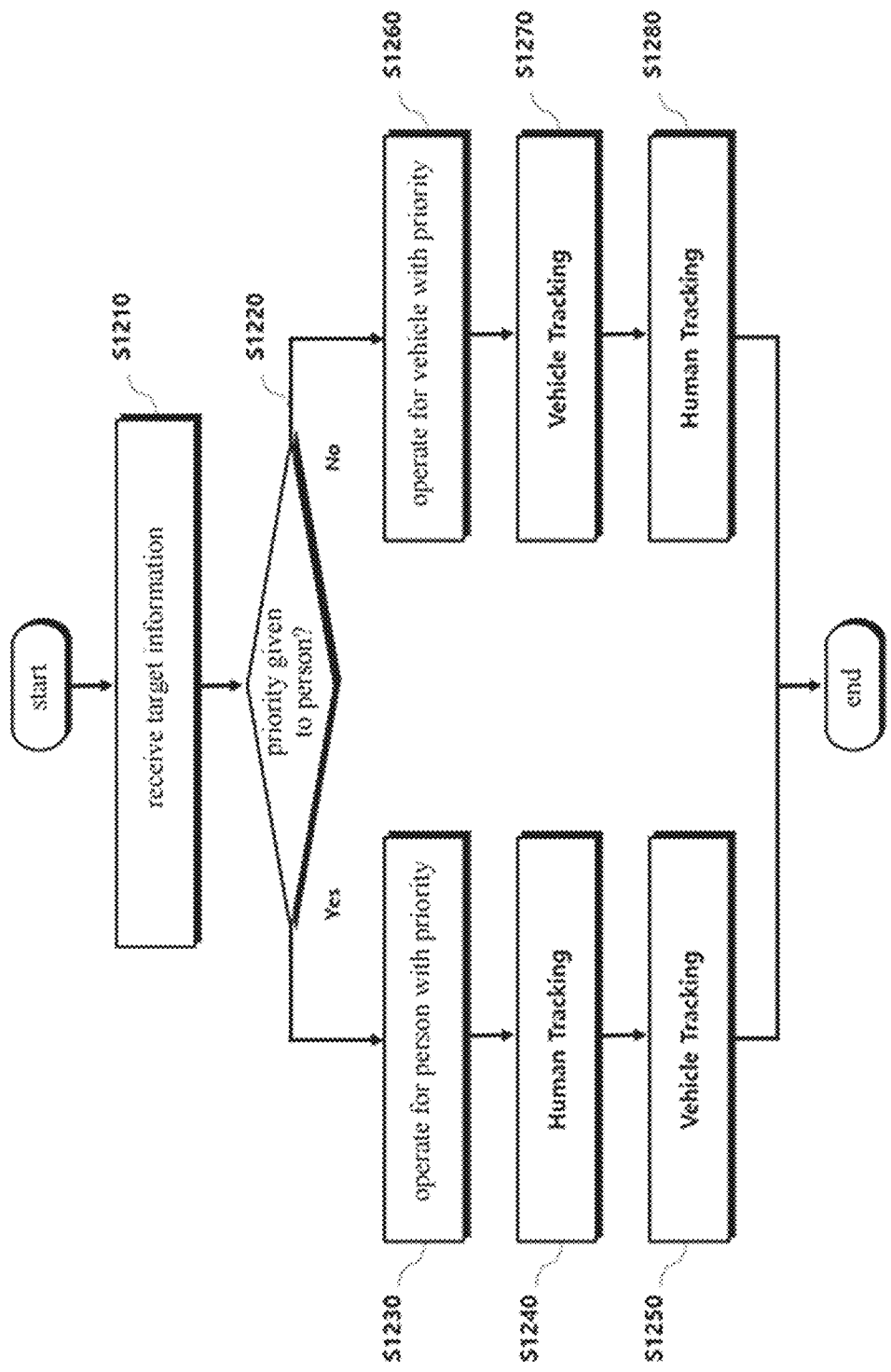
FIG. 12 is a flowchart illustrating a priority-based target tracking method according to an embodiment of the present disclosure.

FIG. 12 is a flowchart illustrating a priority-based target tracking method according to an embodiment of the present disclosure.

The radar security camera 100 transmits a radar signal to a predetermined coverage by using the radar sensor 120 and receives the radar signal reflected from a target existing within the coverage (S1210).

The radar security camera 100 determines whether a target exists within the predetermined coverage based on the reflected signal. When determining that a target exists within the coverage, the radar security camera 100 checks a predetermined priority. The radar security camera 100 first determines whether a target detection priority is given to a person (S1220).

When determining that the target detection priority is a person in step S1220, the radar security camera 100 operates for a person with priority (S1230). The radar security camera 100 tracks a person by applying a person tracking algorithm to the target (S1240).

The radar security camera 100 detects a movement of the target for 30 seconds or longer by applying a daytime human tracking algorithm between 06:00 and 20:00, and identifies the target as a person continuously moving within 100 meters. The radar security camera 100 detects a movement of the target for 30 seconds or longer, and identifies the target as a wandering person. When the target moves at a (running) speed of 10 km/h or more, the radar security camera 100 identifies the target as a fast moving person. When the radar security camera 100 detects fast movements of two or more people at the same location, the radar security camera 100 identifies the targets as persons showing signs of violence.

The radar security camera 100 applies a night human tracking algorithm between 20:00 and 06:00 to identify a person continuously moving within 100 meters. The radar security camera 100 detects a movement of the target for 30 seconds or longer, and identifies the target as a wandering person. When the target moves at a (running) speed of 10 km/h or more, the radar security camera 100 identifies the target as a fast moving person. When two or more persons move within 50 m of the target, the radar security camera 100 determines that the target moves in a group of two or more persons. When the radar security camera 100 detects movements of two or more persons for 10 seconds or longer, the radar security camera 100 identifies that there is a following person. When the radar security camera 100 detects fast movements of two or more people at the same location, the radar security camera 100 identifies the targets as persons showing signs of violence.

After performing the human tracking algorithm on the target, the radar security camera 100 tracks a vehicle by applying a vehicle tracking algorithm to the target (S1250).

The radar security camera 100 identifies a vehicle parked while the target is moving. The radar security camera 100 identifies a vehicle that stops while the target is moving. When the moving speed of the target is 30 km/h to 34 km/h, the radar security camera 100 identifies the target as a fast moving vehicle.

When the target detection priority is a vehicle in step S1220, the radar security camera 100 operates for a vehicle with priority (S1260). The radar security camera 100 tracks a vehicle by applying the vehicle tracking algorithm to the target (S1270). After performing the vehicle tracking algorithm on the target, the radar security camera 100 tracks a person by applying the person tracking algorithm to the target (S1280).

Although steps S1210 to S1280 have been described as sequential in FIG. 12, the present disclosure is not limited thereto. In other words, the steps of FIG. 12 may be performed in a changed manner, or one or more of them may be performed in parallel. Therefore, the steps of FIG. 12 are not limited to a time order.

As described above, the priority-based target tracking method according to the embodiment described in FIG. 12 may be implemented as a program and recorded in a computer-readable recording medium. The computer-readable recording medium recording the program for implementing the priority-based target tracking method according to the embodiment includes all kinds of recording devices in which data readable by a computer system is stored.

Figure 13:
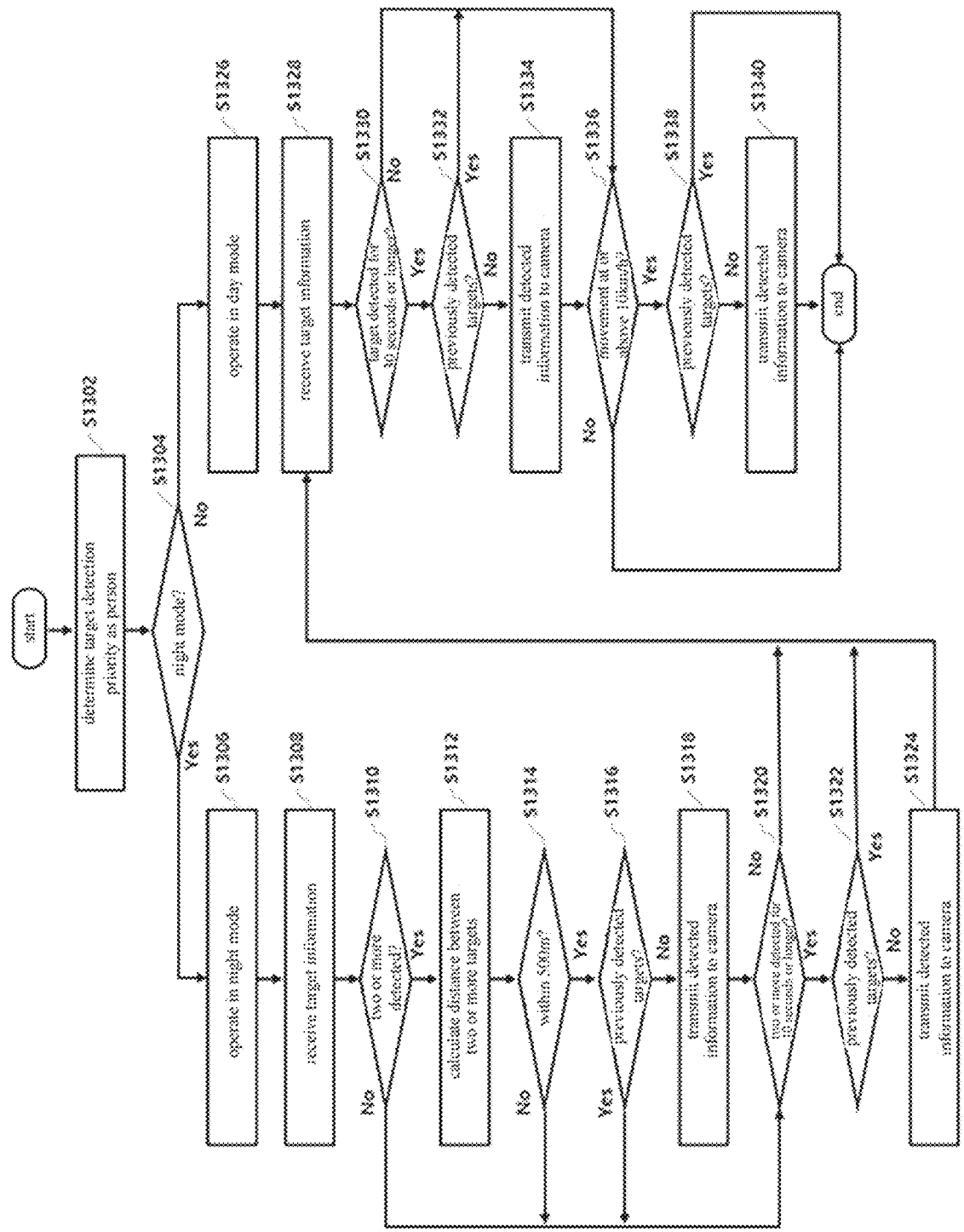
FIG. 13 is a flowchart illustrating a tracking method for a person as a target according to an embodiment of the present disclosure.

FIG. 13 is a flowchart illustrating a tracking method, when a target is a person according to an embodiment of the present disclosure.

The radar security camera 100 identifies that a target detection priority is given to a person, and then operates for a person with priority (S1302).

The radar security camera 100 identifies whether an operation mode is a day mode or a night mode (S1304). When identifying the operation mode as the night mode in step S1304, the radar security camera 100 operates in the night mode (S1306).

The radar security camera 100 transmits a radar signal to a predetermined coverage by using the radar sensor 120 and receives the radar signal reflected from a target existing within the coverage (S1308).

The radar security camera 100 determines whether a target exists within a predetermined coverage based on the reflected signal. When determining that a target exists within the coverage, the radar security camera 100 identifies the target within the coverage primarily as a person. The radar security camera 100 determines whether there are two or more targets (persons) within the coverage (S1310).

When there are two or more targets (persons) within the coverage, the radar security camera 100 calculates the distance between the targets (persons) (S1312). The radar security camera 100 determines whether the distance between the targets (persons) is within 50 m (S1314).

When identifying that the distance between the targets (persons) is within 50 m in step S1314, the radar security camera 100 determines whether the targets (persons) within 50 m are identical to previously detected targets (S1316).

When determining that the targets (persons) within 50 m are not identical to the previously detected targets in step S1316, the radar security camera 100 determines this situation as an abnormal condition that two or more targets exist within 50 m at night, and calculates direction information and distance information about the targets.

The radar security camera 100 rotates the camera in a direction corresponding to the direction information in which the targets exist within 50 m by adjusting the PTZ of the camera 110, and captures and records the targets showing an abnormal sign by adjusting the angle of the camera 110 to an angle corresponding to the distance information (S1318).

The radar security camera 100 determines whether two or more targets existing within a predetermined coverage have been detected for 10 seconds or longer based on a reflected signal (S1320). When detecting two or more targets existing within the coverage for 10 seconds or longer in step S1320, the radar security camera 100 determines whether the targets detected for 10 seconds or longer are identical to previously detected targets (S1322).

When the targets detected for 10 seconds or longer are not identical to the previously detected targets in step S1322, the radar security camera 100 determines the targets detected for 10 seconds or longer at night as an abnormal condition, and calculates direction information and distance information about the targets. The radar security camera 100 rotates the camera in a direction corresponding to the direction information in which the targets are detected for 10 seconds or longer at night by adjusting the PTZ of the camera 110, and captures and records the targets showing an abnormal sign by adjusting the angle of the camera 110 to an angle corresponding to the distance information (S1324).

When determining that the operation mode is the day mode in step S1304, the radar security camera 100 operates in the day mode (S1326). The radar security camera 100 transmits a radar signal to the predetermined coverage by using the radar sensor 120 and receives the radar signal reflected from a target existing within the coverage (S1328).

The radar security camera 100 determines whether a target exists within the predetermined coverage based on a reflected signal. The radar security camera 100 determines whether the target exists for 30 seconds or longer within the coverage (S1330).

When the target exists for 30 seconds or longer within the coverage in step S1330, the radar security camera 100 determines whether the target existing for 30 seconds or longer within the coverage is identical to a previously detected target (S1332).

When the target existing for 30 seconds or longer within the coverage is not identical to a previously detected target in step S1332, the radar security camera 100 determines the target existing for 30 seconds or longer within the coverage as an abnormal condition, and calculates direction information and distance information about the target.

The radar security camera 100 rotates the camera in a direction corresponding to the direction information in which the target exists for 30 seconds or longer within the coverage by adjusting the PTZ of the camera 110, and captures and records the targets showing an abnormal sign by adjusting the angle of the camera 110 to an angle corresponding to the distance information (S1334).

The radar security camera 100 determines whether a target is moving at or above a speed of 10 km/h within the predetermined coverage based on a reflected signal (S1336). When the target is moving at or above 10 km/h within the coverage in step S1336, the radar security camera 100 determines whether the target moving at or above 10 km/h within the coverage is identical to a previously detected target (S1338).

When the target moving at or above 10 km/h within the coverage is not identical to the previously detected target in step S1338, the radar security camera 100 determines the target moving at or above 10 km/h within the coverage in the daytime as an abnormal condition, and calculates direction information and distance information about the target. The radar security camera 100 rotates the camera in a direction corresponding to the direction information in which the target is moving at or above 10 km/h within the coverage by adjusting the PTZ of the camera 110, and captures and records the targets showing an abnormal sign by adjusting the angle of the camera 110 to an angle corresponding to the distance information (S1340).

Although steps S1302 to S1340 have been described as sequential in FIG. 13, the present disclosure is not limited thereto. In other words, the steps of FIG. 13 may be performed in a changed manner, or one or more of them may be performed in parallel. Therefore, the steps of FIG. 13 are not limited to a time order.

As described above, the tracking method for a person as a target according to the embodiment described in FIG. 13 may be implemented as a program and recorded in a computer-readable recording medium. The computer-readable recording medium recording the program for implementing the tracking method for a person as a target according to the embodiment includes all kinds of recording devices in which data readable by a computer system is stored.

Figure 14:
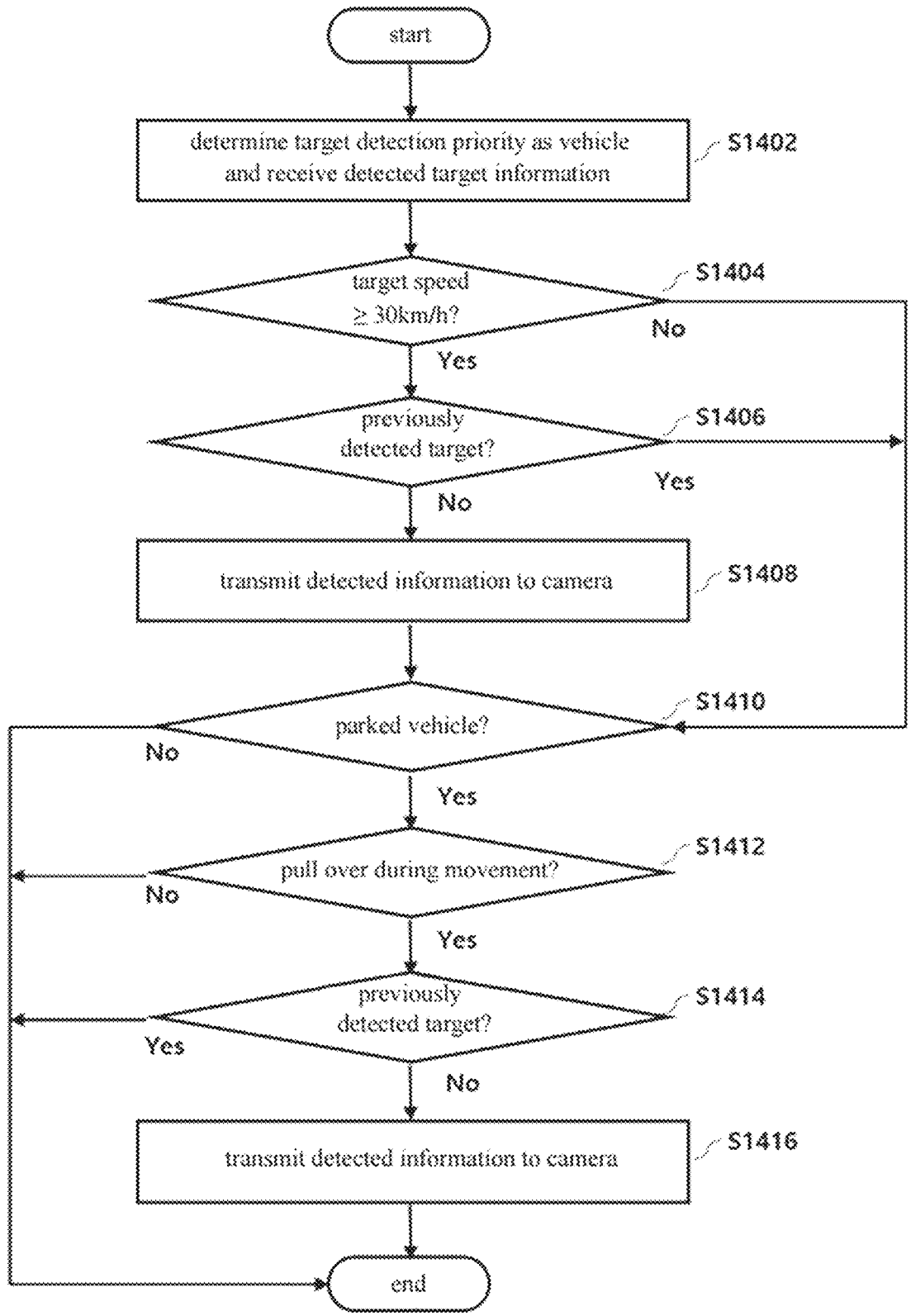
FIG. 14 is a flowchart illustrating a tracking method for a vehicle as a target according to an embodiment of the present disclosure.

FIG. 14 is a flowchart illustrating a tracking method for a vehicle as a target according to an embodiment of the present disclosure.

The radar security camera 100 identifies that the target detection priority is a vehicle and then operates for a vehicle with priority. The radar security camera 100 transmits a radar signal to a predetermined coverage using the radar sensor 120 and receives the radio signal reflected from a target existing within the coverage (S1402).

The radar security camera 100 determines whether a target exists within the predetermined coverage based on the reflected signal. When a target exists within the coverage, the radar security camera 100 recognizes the target existing within the coverage primarily as a vehicle. The radar security camera 100 determines whether the speed of the target (vehicle) existing within the coverage is 30 km/h or more (S1404).

When determining that the speed of the target (vehicle) existing within the coverage is 30 km/h or more in step S1404, the radar security camera 100 determines whether the target (vehicle) moving at or above 30 km/h within the coverage is identical to a previously detected target (S1406).

When determining that the target (vehicle) moving at or above 30 km/h within the coverage is not identical to the previously detected target in step S1406, the radar security camera 100 determines the target (vehicle) moving at or above 30 km/h within the coverage area is an abnormal condition, and calculates direction information and distance information about the target.

The radar security camera 100 adjusts the PTZ of the camera 110 to rotate the camera in a direction corresponding to the direction information in which the target (vehicle) moves at or above 30 km/h within the coverage, and adjusts the angle of the camera 110 to an angle corresponding to the distance information, to capture and record the target showing an abnormal sign (S1408).

The radar security camera 100 determines whether a target moving within the predetermined coverage abruptly stops based on the reflected signal (S1410).

When determining that the target moving within the predetermined coverage abruptly stops in step S1410, the radar security camera 100 determines whether the target abruptly stopping moving is identical to a previously detected target (S1414).

When determining that the target stopping its movement abruptly is not identical to the previously detected target in step S1414, the radar security camera 100 determines the target stopping its movement abruptly as an abnormal condition, and calculates direction information and distance information about the target. The radar security camera 100 adjusts the PTZ of the camera 110 to rotate the camera in a direction corresponding to the direction information in which the target (vehicle) abruptly stops its movement within the coverage in the day time, and adjusts the angle of the camera 110 to an angle corresponding to the distance information, to capture and record the target showing an abnormal sign (S1416).

Although steps S1402 to S1416 have been described as sequential in FIG. 14, the present disclosure is not limited thereto. In other words, the steps of FIG. 14 may be performed in a changed manner, or one or more of them may be performed in parallel. Therefore, the steps of FIG. 14 are not limited to a time order.

As described above, the tracking method for a vehicle as a target according to the embodiment described in FIG. 14 may be implemented as a program and recorded in a computer-readable recording medium. The computer-readable recording medium recording the program for implementing the tracking method for a person as a target according to the embodiment includes all kinds of recording devices in which data readable by a computer system is stored.

Figure 15A:
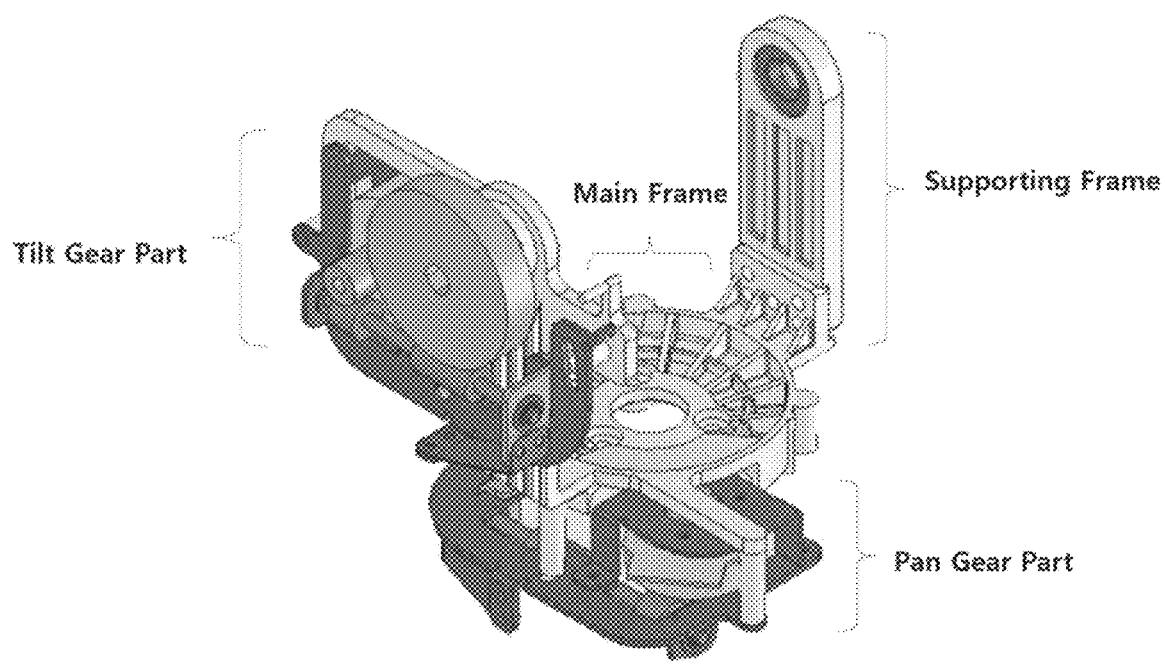
FIGS. 15A and 15B are diagrams illustrating a pan, tilt, and zoom (PTZ) structure according to an embodiment of the present disclosure.
Figure 15B:
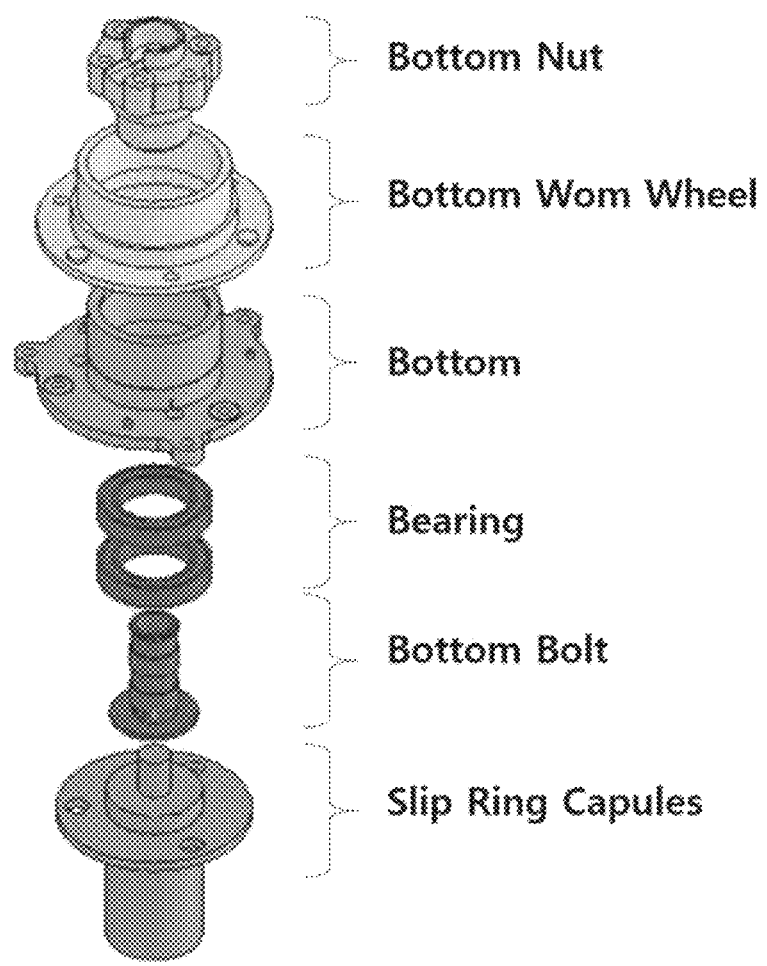

FIGS. 15A and 15B are diagrams illustrating a PTZ structure according to an embodiment of the present disclosure.

The radar security camera 100 is driven in combination with a PTZ module. The PTZ module includes a tilt gear part, a pan gear part, a main frame, and a supporting frame. A gear bracket included in the PTZ module prevents bending through overall reinforcement. The gear part included in the PTZ module seeks stabilization during assembly and operation by changing a rotational axis to a central axis. A bottom nut is engaged with a bottom bolt, with two bearings fitted to a bottom therebetween. The bottom nut is coupled to the main frame and rotates together with the main frame. A bottom worm wheel coupled with the fixed bottom is engaged with a pan keyer coupled with the main frame, and serves the center of rotation of a pan unit.

The PTZ module includes a main controller to control a motor.

The main controller controls main functions of the camera (zoom, focus, IRIS, DAY&NIGH, etc.) through RS232 communication with a zoom camera module by using an MCU. The main controller controls a pan/tilt motor control IC by UART communication with a radar module.

The main controller is divided into a boot area and a program area. Basic software is installed in the boot area, whereas F/W responsible for all controls, and multi-protocols for communication with the outside are installed in the program area.

A motor control unit is divided into a pan motor controller for horizontal rotation and a tilt motor controller for vertical rotation. The motor control unit receives an external command and moves a step motor to coordinates processed by the MCU. The motor control unit receives coordinate value data from a radar controller and controls the motor to the position of a target.

For object tracking in a PTZ camera, panning for controlling left and right movement, and tilting for controlling vertical movement need to be controlled to control a camera movement.

A pan and tilt control system includes a stepping motor capable of micro-stepping based on an MSP432 main SoC. The pan and tilt control system controls panning and tilting using a motor driver IC.

Panning and tilting are controlled by a Pelco-D protocol in the system.

The Pelco-D protocol is an international communication protocol for controlling the PTZ of the PTZ camera. The format of a Pelco-D protocol command message packet is shown in [Table 1].

TABLE 1

| Byte 1 | Byte 2 | Byte 3 | Byte 4 | Byte 5 | Byte 6 | Byte 7 |
|---|---|---|---|---|---|---|
| Sync | Camera address | Command 1 | Command 2 | Data 1 | Data 2 | Checksum |

The format of a Pelco-D protocol PTZ control data packet is shown in [Table 2].

TABLE 2

| | Command 1 (byte 3) | Command 2 (byte 4) | Data 1 (byte 5) | Data 2 (byte 6) |
|---|---|---|---|---|
| Bit 7 | Sense | Focus far | Pan speed 00 (Stop) to 3F (Max speed) 40 (Turbo) | Pan speed 00 (Stop) to 3F (Max speed) |
| Bit 6 | Reserved | Wide zoom | | |
| Bit 5 | Reserved | Zoom tale | | |
| Bit 4 | Auto scan/manual scan | Pan down | | |
| Bit 3 | Camera on/camera off | Pan up | | |
| Bit 2 | Iris close | Tilt left | | |
| Bit 1 | Iris open | Tilt right | | |
| Bit 0 | Focus near | 0 | | |

The Pelco-D protocol transmits a command packet of the same format as shown in [Table 1] and [Table 2], and executes the command by interpreting data for each byte. The first byte is a Sync byte, which is a byte for synchronization with the camera. The synchronization with the camera is achieved by transmitting a byte fixed to FF.

An up to 32 micro stepping motor operation is supported by using a P/T stepper motor driver, DRV8825, for panning and tilting control.

To control panning and tilting, the stepper motor is adjusted to move 0.9 degrees for up to 32 steps. The resulting support of a more precise and accurate speed and step movement leads to improvement of the accuracy of a P/T operation of the PTZ camera.

The panning and tilting of the PTZ camera may be initialized by attaching a hall sensor for panning and tilting, and two DRV8825 stepper motor drivers enable simultaneous operations of two stepper motors.

As is apparent from the foregoing description, according to the present disclosure, a target may be detected by 360° radar sensing regardless of the rotation radius of a camera by using a security camera having a built-in radar, and the camera may be enabled to track the target according to the moving direction and specific signs of the target after the target is identified as a person and a vehicle sequentially according to a decision priority order.

Those skilled in the art will appreciate that the disclosure may be carried out in other specific ways than those set forth herein without departing from the spirit and essential characteristics of the disclosure. The above embodiment is therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:
1. An intelligent control method comprising:
acquiring an image while rotating 360° in one predetermined direction by a camera;
transmitting a radar signal in a coverage covering 360° by using two radar sensors each covering 180°;
receiving the radar signal reflected from a target existing within the coverage;
determining whether a target exists within the coverage based on the reflected signal;
when a target exists within the coverage, determining whether a decision priority for the target existing within the coverage is a person or a vehicle;

determining whether the target has an abnormal sign, while tracking the target in an order based on the decision priority;

when it is determined that the target has an abnormal sign, calculating direction information and distance information about the target; and rotating the camera in a direction corresponding to the direction information by controlling pan, tilt, and zoom (PTZ) of the camera, and capturing and recording the target showing the abnormal sign by adjusting an angle of the camera to an angle corresponding to the distance information;

when it is determined that the decision priority is a person, operating in a night mode according to a current time;

determining whether two or more targets are detected for a predetermined second threshold time or longer within the coverage;

when two or more targets are detected for the predetermined second threshold time or longer within the coverage, determining whether the two or more targets detected for the predetermined second threshold time or longer within the coverage are identical to previously detected targets;

when the two or more targets detected for the predetermined second threshold time or longer within the coverage are not identical to the previously detected targets, determining the two or more targets detected for the predetermined second threshold time or longer within the coverage as an abnormal condition, and calculating direction information and distance information about the targets; and rotating the camera in a direction corresponding to the direction information in which the two or more targets are detected for the predetermined second threshold time or longer within the coverage by controlling the PTZ of the camera, and capturing and recording the targets showing an abnormal sign by adjusting the angle of the camera to an angle corresponding to the distance information.

2. The intelligent control method according to claim 1, further comprising:

when it is determined that the decision priority is a person, recognizing the target existing within the coverage primarily as a person and tracking the target; and upon completion of the tracking of the target as a person, recognizing the target existing within the coverage secondarily as a vehicle and tracking the target.

3. The intelligent control method according to claim 2, further comprising:

when it is determined that the decision priority is a person, operating in a day mode according to a current time;

determining whether a target exists for a predetermined first threshold time or longer within the coverage based on the reflected signal;

when the target exists for the first threshold time or longer within the coverage, determining whether the target existing for the first threshold time or longer within the coverage is identical to a previously detected target;

when the target existing for the first threshold time or longer within the coverage is not identical to the previously detected target, determining the target existing for the first threshold time or longer within the coverage as an abnormal condition, and calculating direction information and distance information about the target; and rotating the camera in a direction corresponding to the direction information in which the target exists for the first threshold time or longer within the coverage by controlling the PTZ of the camera, and capturing and recording the target showing an abnormal sign by adjusting the angle of the camera to an angle corresponding to the distance information.

4. The intelligent control method according to claim 2, further comprising:

when it is determined that the decision priority is a person, operating in a day mode according to a current time;

determining whether a target is moving at a speed equal to or larger than a predetermined first threshold speed within the coverage based on the reflected signal;

when the target is moving at the speed equal to or larger than the first threshold speed within the coverage, determining whether the target moving at the speed equal to or larger than the first threshold speed within the coverage is identical to a previously detected target;

when the target moving at the speed equal to or larger than the first threshold speed within the coverage is not identical to the previously detected target, determining the target moving at the speed equal to or larger than the first threshold speed within the coverage as an abnormal condition, and calculating direction information and distance information about the target; and rotating the camera in a direction corresponding to the direction information in which the target is moving at the speed equal to or larger than the first threshold speed within the coverage by controlling the PTZ of the camera, and capturing and recording the target showing an abnormal sign by adjusting the angle of the camera to an angle corresponding to the distance information.

5. The intelligent control method according to claim 2, further comprising:

when it is determined that the decision priority is a person, operating in a night mode according to a current time;

determining whether there are two or more targets within the coverage based on the reflected signal;

when there are two or more targets within the coverage, calculating a distance between the targets;

determining whether the distance between the targets is equal to or less than a predetermined threshold distance;

when it is determined that the distance between the targets is equal to or less than the predetermined threshold distance, determining whether the two or more targets spaced from each other by the distance equal to or less than the predetermined threshold distance are identical to previously detected targets;

when the two or more targets spaced from each other by the distance equal to or less than the predetermined threshold distance are not identical to the previously detected targets, determining the two or more targets spaced from each other by the distance equal to or less than the predetermined threshold distance as an abnormal condition, and calculating direction information and distance information about the targets; and rotating the camera in a direction corresponding to the direction information in which the two or more targets are spaced from each other by the distance equal to or less than the predetermined threshold distance by controlling the PTZ of the camera, and capturing and recording the targets showing an abnormal sign by adjusting the angle of the camera to an angle corresponding to the distance information.

6. The intelligent control method according to claim 1, further comprising:
when it is determined that the decision priority is a vehicle, recognizing the target existing within the coverage primarily as a vehicle and tracking the target; and
upon completion of the tracking of the target as a vehicle, recognizing the target existing within the coverage secondarily as a person and tracking the target.

7. The intelligent control method according to claim 6, further comprising:
determining whether two or more targets are moving at a speed equal to or larger than a predetermined second threshold speed within the coverage based on the reflected signal;
when the targets are moving at the speed equal to or larger than the second threshold speed within the coverage, determining whether the targets moving at the speed equal to or larger than the second threshold speed within the coverage are identical to previously detected targets;
when the targets moving at the speed equal to or larger than the second threshold speed within the coverage are not identical to the previously detected targets, determining the targets moving at the speed equal to or larger than the second threshold speed within the coverage as an abnormal condition, and calculating direction information and distance information about the target; and
rotating the camera in a direction corresponding to the direction information in which the targets are moving at the speed equal to or larger than the second threshold speed within the coverage by controlling the PTZ of the camera, and capturing and recording the targets showing an abnormal sign by adjusting the angle of the camera to an angle corresponding to the distance information.

8. The intelligent control method according to claim 6, further comprising:
determining whether a target moving within the coverage abruptly stops based on the reflected signal;
when the target moving within the coverage abruptly stops, determining whether the target abruptly stopping movement within the coverage is identical to a previously detected target;
when the target abruptly stopping movement within the coverage is not identical to the previously detected target, determining the target abruptly stopping movement within the coverage as an abnormal condition, and calculating direction information and distance information about the target; and
rotating the camera in a direction corresponding to the direction information in which the target moving within the coverage abruptly stops by controlling the PTZ of the camera, and capturing and recording the target showing an abnormal sign by adjusting the angle of the camera to an angle corresponding to the distance information.

9. The intelligent control method according to claim 1, wherein to determine whether the target exists within the coverage, the radar sensors acquire intermediate frequency (I/F) sampling signals from an antenna, a smaller number of samples are acquired by reducing N sampling signals acquired from the antenna at a predetermined ratio by using a sub-sampler, a computation process is performed to reduce a side lobe of the samples by using a window function, fast Fourier transform (FFT) is performed on a signal obtained by performing the window function, it is determined whether an object exists within a window, while a constant false alarm rate (CFAR) of the FFT signal is maintained by using CFAR, a modification is made to detect only the surroundings of a corresponding position by local CFAR based on rough position information about the object detected by the CFAR in a first step, a direction of arrival (DOA) is measured by using the two radar sensors, and the position (coordinates) of the object is calculated using distance information obtained by peek detection as well.

10. The intelligent control method according to claim 9, wherein when the magnitude of the reflected signal is equal to or larger than a predetermined magnitude by using the CFAR, a threshold is selected to maintain an object detection error probability at a predetermined level by using the CFAR, and it is determined whether a test cell is a target according to a relationship between a cell at a test position and a neighboring cell by using the CFAR.

11. The intelligent control method according to claim 1, wherein after a communication protocol required for generating a communication channel between the radar sensors and the camera, informing an intruder path, and transmitting an error when an abnormality occurs in a radar is defined, when the camera is powered on and initially connected to a network by self-registration (provision), the camera informs that a new radar has been connected to the camera and a server connected to a current network, receives information about a position of the radar in a standard coordinate system, a direction of the radar, and an object motion detection area in a detection zone of the radar, and calculates an angle from a phase difference between two antennas of the radar sensors by using a DOA based on the information.

* * * * *